United States Patent Office 2,847,794
Patented Aug. 19, 1958

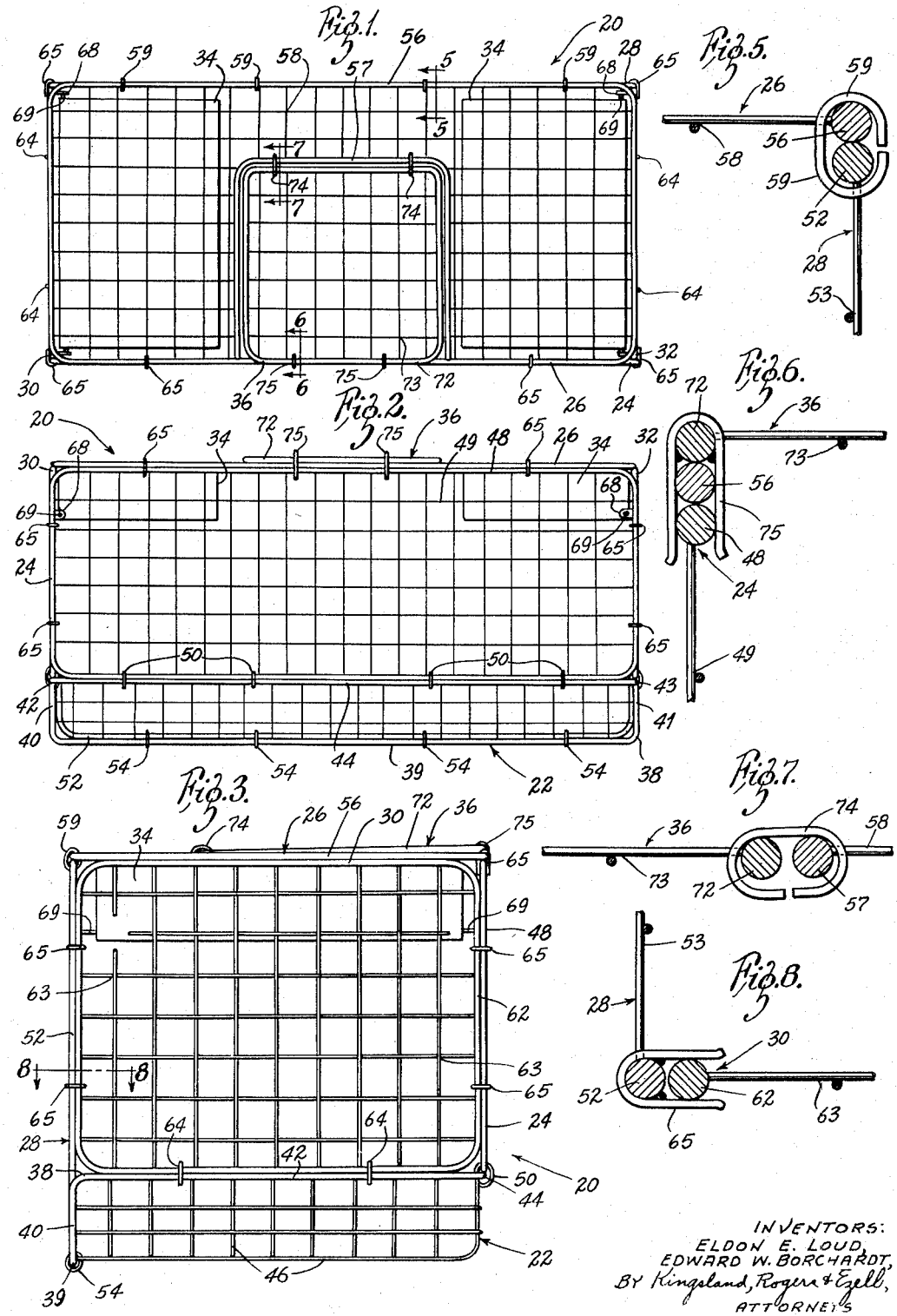

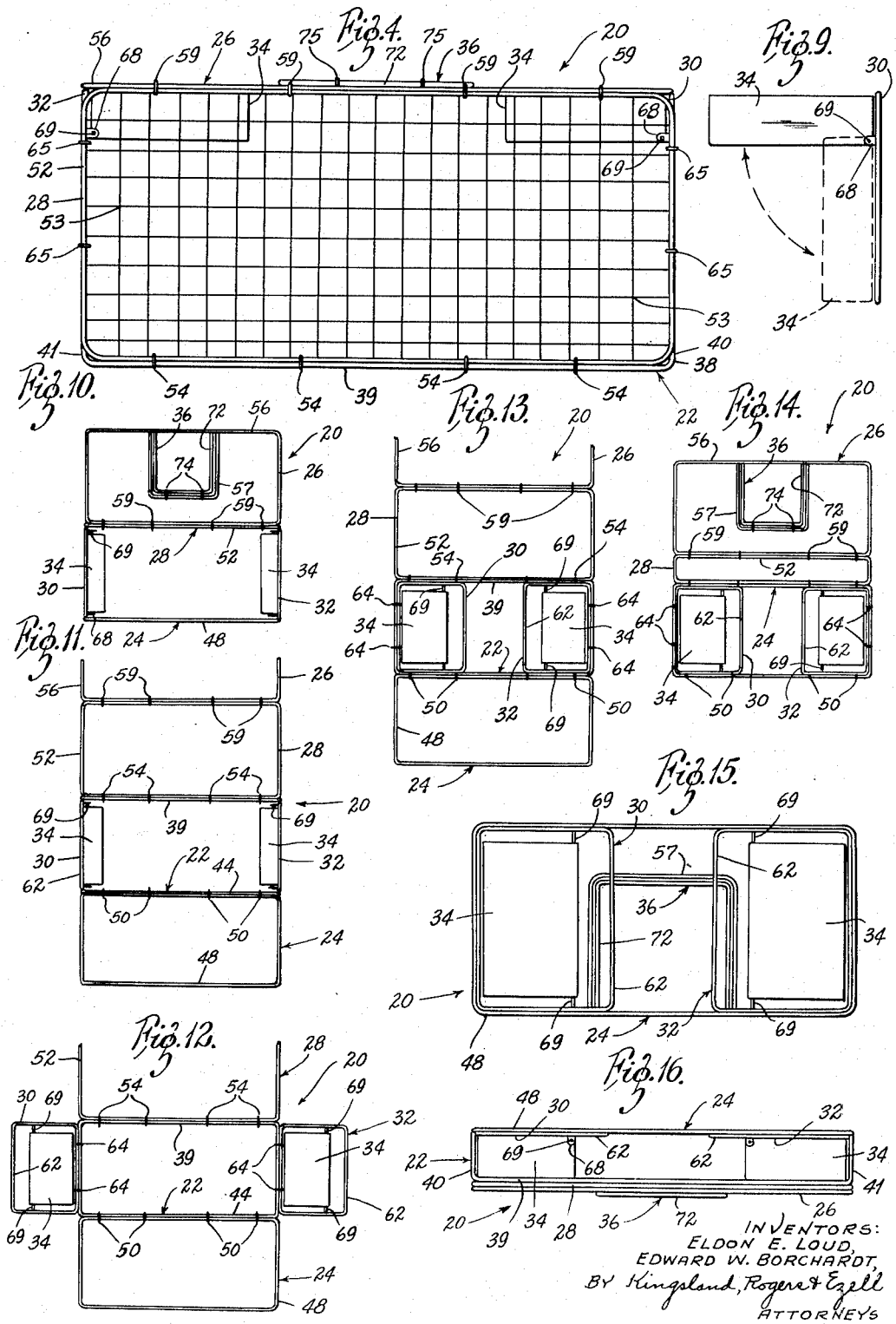

2,847,794

FISH LIVE BOX

Eldon E. Loud, Ferguson, Mo., and Edward W. Borchardt, deceased, late of Morse Mill, Mo., by Olive M. Borchardt, administratrix, St. Louis, Mo.

Application September 16, 1954, Serial No. 456,512

7 Claims. (Cl. 43—55)

The present invention relates generally to the fishing art, and more particularly to a novel fish live box.

There has long existed the need for a fish live box adapted to maintain the fish caught by the angler alive in the water, which has sufficient capacity for an average catch, yet which occupies a minimum space for transporting and for storage purposes. Another desirable feature of such a box is that it float through the medium of some means capable of accomplishing the floating action of the box, yet adapted to stand rough handling and to fit into the requirement of small space occupancy for transportation and storage purposes.

Therefore, an object of the present invention is to provide a fish live box which incorporates these features long desired in such a device.

In brief, the present fish live box comprises a cage of wire mesh, or other suitable material, including a bottom portion into and about which floats and the several sides and top fit to form a collapsed unit for transportation and storage purposes. A float is pivotally connected to each of the end frames which fold into the bottom portion. One side frame or panel is pivoted to the base of the bottom portion, the top panel being pivotally connected to the other edge of this side panel, so that both the top and side panels may be disposed beneath the bottom section when the box is in collapsed relation. A second side panel is pivoted to the upper edge of the other side of the bottom portion and is disposed above the float units when collapsed. Suitable clips are provided for maintaining the several panels in operative relation when it is desired to use the box, which also aid in maintaining the panels in collapsed positions.

Hence, another object of the present invention is to provide a novel fish live box which may be collapsed into and maintained in a relatively small space when it is desired to transport or store, or otherwise handle the device when not in use.

Another object is to provide a novel fish live box which is of wire panel construction, thereby comprising a relatively light weight, yet sturdy unit capable of long use.

Another object is to provide a novel fish live box incorporating permanent type float units which require no maintenance and which are formed to fit in between certain panels of the live box when in collapsed position.

Other objects are to provide a novel fish live box which is relatively inexpensive, which may be easily set up in its operative relation from a collapsed position with minimum instruction, and which may be as easily collapsed following use, and which otherwise fulfills the objects and advantages sought therefor.

The foregoing and other objects and advantages are apparent from the following description taken with the accompanying drawings, in which:

Figure 1 is a top plan view of a fish live box constructed in accordance with the present invention;

Figure 2 is a side elevational view thereof;

Figure 3 is an end elevational view thereof on a larger scale;

Figure 4 is a side elevational view thereof looking toward the side opposite that shown in Figure 2;

Figure 5 is an enlarged cross-sectional view on substantially the line 5—5 of Figure 1;

Figure 6 is an enlarged cross-sectional view on substantially the line 6—6 of Figure 1;

Figure 7 is an enlarged cross-sectional view on substantially the line 7—7 of Figure 1;

Figure 8 is an enlarged cross-sectional view on substantially the line 8—8 of Figure 3;

Figure 9 is a side elevational view of one of the end panels apart from the live box illustrating the pivotal relationship of the float in respect thereto; and Figures 10 through 16 are diagrammatic views illustrating the manner in which the present live box is folded from open to closed position, wire mesh and clips being omitted for clarity.

Referring to the drawings more particularly by reference numerals, 20 indicates generally a fish live box incorporating the teachings of the present invention. The live box 20 includes a lower base or shallow basket portion 22, a front panel 24, a top panel 26, a rear panel 28, end panels 30 and 32, float units 34, and a gate 36. A carry handle or strap may be provided, if desired. One panel embodiment is illustrated, but any other suitable form may be used.

The basket portion 22 comprises a heavy wire frame 38, which is preferably a continuous member through means of welding or otherwise joining together the ends of the wire. The wire frame 38 includes a lower horizontal side portion 39, vertical end portions 40 and 41, horizontal upper end portions 42 and 43, and an upper horizontal front portion 44. Formed wire mesh 46 is secured to the aforesaid frame portions by soldering, welding, or the like, and depends from the horizontal end portions 42 and 43 and the horizontal front portion 44 to complete the basket portion 22 which is open at the rear above the lower horizontal portion 39, as is clear from the drawings.

The front panel 24 comprises a rectangular heavy wire frame 48, preferably continuous, soldered or otherwise secured to which is a wire mesh sheet 49. The front panel 24 is hinged or pivoted to the upper portion 44 of the frame 38 by spaced rings 50.

The rear panel 28 comprises a rectangular heavy wire frame 52, preferably continuous, to which is soldered or otherwise secured a wire mesh sheet 53. The rear panel 28 is hinged or pivotally connected to the lower portion 39 of the frame 38 by spaced rings 54, as is clear from Figure 4.

The top panel 26 comprises a continuous heavy wire frame 56. A U-shaped heavy wire frame 57 is welded to the frame 56 and is disposed interiorly thereof and in the same plane therewith, as is clear from the drawings. A wire mesh sheet 58 is soldered or otherwise secured to the frame 56 and to the frame 57, as is clear from Figure 1, the area interiorly of the U-shaped frame 57 being free of wire mesh. The panel 26 is hinged or pivoted to the upper edge of the rear panel 28 by spaced rings 59. Suitable latching clips, or the like, are secured to the frame 56 along the free forward portion, which engage the upper edge of the front panel 24 when the box 20 is in use relation.

The end panels 30 and 32 are identical, each comprising a heavy wire frame 62, preferably continues, to which is soldered or otherwise secured a sheet of wire mesh 63. The end panels 30 and 32 are hinged or pivoted to the horizontal upper portions 42 and 43, respectively, of the frame 38 by means of spaced rings 64.

Soldered, welded, or otherwise secured to the front panel 24, the rear panel 28 and the top panel 26 are spaced U-shaped spring clips 65, as is clear from the drawings.

Where it is not desired that the clips 65 function to hold the panels in collapsed relation, they may comprise simple U-shaped staples, although the resilient clamping effect of a spring clip is preferable.

Each float 34 is pivotally mounted on an end panel 30 and 32 by brackets 68 welded or otherwise secured to the frames 62 and pinions 69 welded or otherwise secured to the floats 34. The relationship of the float 34 to the end panel 30 (or 32) is illustrated in full lines in Figure 9 when the live box 20 in use in water, the relationship of the float 34, when the live box is in open position out of water, being illustrated in broken lines. The floats 34 are illustrated as sealed light weight metal boxes, but any other suitable float will serve.

The door 36 comprises a generally square heavy wire frame 72, preferably continuous, to which is soldered or otherwise connected a wire mesh sheet 73. As is clear from Figures 1 and 7, the gate 36 is hinged or pivoted to the frame 57 by rings 74. Latch clips 75 are welded or otherwise secured to the front portion of the frame 72, as is clear from Figures 1 and 6.

In Figures 1 through 4, the live box 20 is shown in use position with the floats 34 held up in raised floating position. Normally, the floats 34 will be depending against the end panels 30 and 32 when the box 20 is not in water.

In Figures 10 through 16 are diagrammatically illustrated the steps in folding the box 20 to the transport compact relation of Figure 16. In Figure 10, the top panel 26 is shown folded back, the float units 34 being in depending relation with the side panels 30 and 32. In Figure 11, the top panel 26 and the rear panel 28 are illustrated as extended rearwardly from the basket or base portion 22, the front panel 24 being in forwardly pivoted position. In Figure 12, the side panels 30 and 32 are also extended laterally relative to the basket portion 22, illustrating the relationship of the float units 34 thereto. In Figure 13, the side panels 30 and 32, together with the pivotally supported float units 34, are folded into the basket portion 22, the float units 34 being therewithin and the side panels 30 and 32 being in a plane parallel with and just below the plane of the frame portions 42 and 44, as is clear from Figure 16 taken with Figure 13. In Figure 14, the front panel 24 is shown folded onto the side panels 30 and 32, the rear panel 28 being in slanting downwardly extending position preparatory to being folded beneath the basket portion 22. In Figures 15 and 16, the live box 20 is illustrated in its compact folded arrangement, Figure 15 being a top plan view and Figure 16 a front elevational view thereof. In these two views, the rings are also omitted in the interest of clarity.

It will be noted that the clips 65 are secured to the front panel 24, the top panel 26, and the rear panel 28, but they could be secured to the end panels 30 and 32 with the dimensional relationship of the several panels adjusted accordingly. Secured as illustrated, the clips 65 also engage adjacent structure when the panels 24, 26, 28, 30 and 32 are folded into collapsed relation to maintain such relationship. The clips 65 on the first panel 24 engage the end portions 42 and 43 of the frame 38, whereas the clips 65 of the top panel 26 engage the ends of the rear panel 28 and the ends of the formed wire mesh 46. Manifestly, additional securing means may be provided if desired.

It is apparent that there has been provided a live box which achieves the objectives sought.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A collapsible live box comprising a base portion, said base portion comprising a shallow basket, end panels, a front panel and a rear panel all pivotally mounted on said base portion, a top panel pivotally connected to said rear panel, and a float unit pivotally connected to each end panel, said float units being within said basket when said box is in collapsed position.

2. A collapsible live box comprising a basket portion open at the rear side, a front panel pivotally connected to the upper front edge of said basket portion, opposed side panels pivotally connected to the upper side edges of said basket portion, a rear panel pivotally connected at its lower side edge to the lower rear edge of said basket portion in substantially the plane of the bottom thereof, a top panel pivotally connected to the other side edge of said rear panel and having an access gate therein, means for maintaining said panels in box-forming position, and a float unit pivotally connected to each side panel and arranged to float against said top panel when said box is in water and to depend against its supporting side panel when said box is out of water.

3. A collapsible live box comprising a basket portion open at the rear side, a front panel pivotally connected to the upper front edge of said basket portion, opposed side panels pivotally connected to the upper side edges of said basket portion, a rear panel pivotally connected at its lower side edge to the lower rear edge of said basket portion in substantially the plane of the bottom thereof, a top panel pivotally connected to the other side edge of said rear panel and having an access gate therein, means for maintaining said panels in box-forming position, and a float unit pivotally connected to each side panel and arranged to float against said top panel when said box is in water and to depend against its supporting side panel when said box is out of water, said float units being disposed within said basket portion when said box is in collapsed position.

4. A collapsible live box comprising a basket-like base portion of wire mesh on a heavy wire frame, said base portion including a horizontal lower panel, an upstanding auxiliary front panel, and two upstanding auxiliary end panels, a main front panel of wire mesh on a heavy wire frame hinged to the upper edge of said auxiliary front panel, a main end panel of wire mesh on a heavy wire frame hinged to the upper edge of each of said auxiliary end panels, a rear panel of wire mesh on a heavy wire frame hinged to the rear edge of said lower panel, a horizontal upper panel hinged to one edge of said rear panel, and releasable fastening means for retaining said live box in expanded rectangular box-like form having a height substantially equal to the combined vertical dimensions of the auxiliary front panel and the main front panel, said live box being collapsible to a rectangular box-like form having a height substantially equal to the vertical dimension of the auxiliary front panel plus the thickness of said rear panel and said upper panel, rectangular float means hinged to at least one of said panels so as to enable the float means to occupy a horizontal position flush against the underneath side of the upper panel when the live box is in expanded condition and to occupy a horizontal position flush against the top side of the lower panel when the live box is in collapsed condition.

5. The live box of claim 4 wherein the rectangular float means has a thickness dimension substantially equal to the vertical height of the auxiliary front panel.

6. The live box of claim 5 wherein the float means comprises two separate rectangular floats, each float being hingedly connected to a different one of said main end panels.

7. The live box of claim 6 wherein the floats are so dimensioned as to leave a substantial space between them when they are flush against the upper panel, and wherein the upper panel is provided with a hinged door located between the floats.

References Cited in the file of this patent

UNITED STATES PATENTS

| | | |
|---|---|---|
| 66,881 | Parks | July 16, 1867 |
| 268,558 | Small | Dec. 5, 1882 |
| 316,775 | Hardman | Apr. 28, 1885 |
| 634,733 | Jones | Oct. 10, 1899 |
| 677,683 | Murphy | July 2, 1901 |
| 785,451 | Tourville | Mar. 21, 1905 |
| 923,725 | Sterrett | June 1, 1909 |
| 1,054,561 | Kennedy | Feb. 25, 1913 |
| 1,443,901 | Murray | Jan. 30, 1923 |
| 2,231,619 | Fenton | Feb. 11, 1941 |
| 2,530,148 | Bjorklund | Nov. 14, 1950 |

FOREIGN PATENTS

| | | |
|---|---|---|
| 687 | Great Britain | of 1853 |
| 1,298 | Great Britain | 1881 |
| 474,531 | Canada | June 19, 1951 |